United States Patent
Brouillet et al.

(10) Patent No.: US 10,870,079 B2
(45) Date of Patent: Dec. 22, 2020

(54) AIR-OIL SEPARATOR WITH FIRST SEPARATOR RADIALLY OUTWARD OF MATRIX SEPARATOR

(71) Applicant: PRATT & WHITNEY CANADA CORP., Longueuil (CA)

(72) Inventors: Sylvain Brouillet, St-Basile-le-Grand (CA); Pierre Gauvin, St-Bruno-de-Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 220 days.

(21) Appl. No.: 15/949,240

(22) Filed: Apr. 10, 2018

(65) Prior Publication Data
US 2019/0308128 A1    Oct. 10, 2019

(51) Int. Cl.
*B01D 45/00* (2006.01)
*B01D 50/00* (2006.01)
(Continued)

(52) U.S. Cl.
CPC .......... *B01D 50/002* (2013.01); *B01D 45/14* (2013.01); *B01D 46/0024* (2013.01);
(Continued)

(58) Field of Classification Search
CPC .............. B01D 50/002; B01D 46/0024; B01D 46/0056; B01D 46/0031; B01D 45/14;
(Continued)

(56) References Cited

U.S. PATENT DOCUMENTS

| | | | | |
|---|---|---|---|---|
| 3,561,195 A | * | 2/1971 | Bouru | B01D 45/14 55/409 |
| 4,049,401 A | * | 9/1977 | Smith | B01D 45/14 55/401 |

(Continued)

FOREIGN PATENT DOCUMENTS

GB    2519977 B    10/2015

OTHER PUBLICATIONS

An Integrated De-Aerator and Breather Pump and Methods Thereof; The Director General, Defence Research & Development Organisation (DRDO), Ministry of Defence, Government of India, Room No. 348, B-wing, DRDO Bhawan, Rajaji Marg, New Delhi-110011, India.

*Primary Examiner* — Dung H Bui
(74) *Attorney, Agent, or Firm* — Norton Rose Fulbright Canada LLP

(57) ABSTRACT

There is disclosed a separator having a first separator and a matrix separator. The first separator caters to an air-oil mixture having a first oil concentration and the matrix separator caters to an air-oil mixture having a second oil concentration being less than the first oil concentration. The matrix separator is disposed at least partially concentrically within the first separator. A wall is disposed radially between the first and second separators. A radial passage extends through the wall. An air-oil mixture outlet of the first separator is fluidly connected to an air-oil mixture inlet of the matrix separator via the radial passage. At least one passage extends radially outwardly from the matrix separator across the first separator. The at least one passage fluidly connects the matrix separator to an environment outside the air-oil separator. A method of removing oil from an air-oil mixture is also disclosed.

17 Claims, 4 Drawing Sheets

(51) Int. Cl.
*B01D 45/14* (2006.01)
*B01D 46/00* (2006.01)
*F02C 7/06* (2006.01)
*F01D 25/18* (2006.01)
*F01M 13/04* (2006.01)
*F02C 7/32* (2006.01)

(52) U.S. Cl.
CPC ..... *B01D 46/0031* (2013.01); *B01D 46/0056* (2013.01); *B01D 2267/40* (2013.01); *B01D 2275/202* (2013.01); *B01D 2275/40* (2013.01); *F01D 25/18* (2013.01); *F01M 13/04* (2013.01); *F01M 2013/0422* (2013.01); *F02C 7/06* (2013.01); *F02C 7/32* (2013.01); *F05D 2240/50* (2013.01); *F05D 2260/609* (2013.01); *F05D 2300/514* (2013.01)

(58) Field of Classification Search
CPC .......... B01D 2275/202; B01D 2275/40; B01D 2267/40; F02C 7/06; F02C 7/32; F05D 2260/609; F05D 2240/50; F05D 2300/514; F01D 25/18; F01M 2013/0422; F01M 13/04
See application file for complete search history.

(56) References Cited

U.S. PATENT DOCUMENTS

| | | | |
|---|---|---|---|
| 4,981,502 A | 1/1991 | Gottschalk | |
| 5,114,446 A * | 5/1992 | Giersdorf | F01D 25/18 55/345 |
| 5,716,423 A | 2/1998 | Krul et al. | |
| 5,776,229 A * | 7/1998 | Blanes | B01D 45/14 55/407 |
| 6,033,450 A | 3/2000 | Krul et al. | |
| 6,398,833 B1 * | 6/2002 | Santerre | B01D 45/12 55/409 |
| 6,858,056 B2 * | 2/2005 | Kwan | B01D 45/14 55/400 |
| 7,063,734 B2 * | 6/2006 | Latulipe | B01D 50/002 55/337 |
| 8,337,581 B2 * | 12/2012 | Dejaune | B01D 45/14 55/385.1 |
| 8,657,931 B2 * | 2/2014 | Short | F01M 13/04 55/408 |
| 8,696,779 B2 * | 4/2014 | Belmonte | F01D 25/18 55/406 |
| 8,945,284 B2 * | 2/2015 | Short | F01D 25/183 95/270 |
| 9,028,576 B2 * | 5/2015 | Slayter | F02C 6/00 55/405 |
| 9,370,739 B2 | 6/2016 | Beier et al. | |
| 9,587,560 B2 | 3/2017 | Beier et al. | |
| 10,018,087 B2 | 7/2018 | Prunera-Usach et al. | |

* cited by examiner

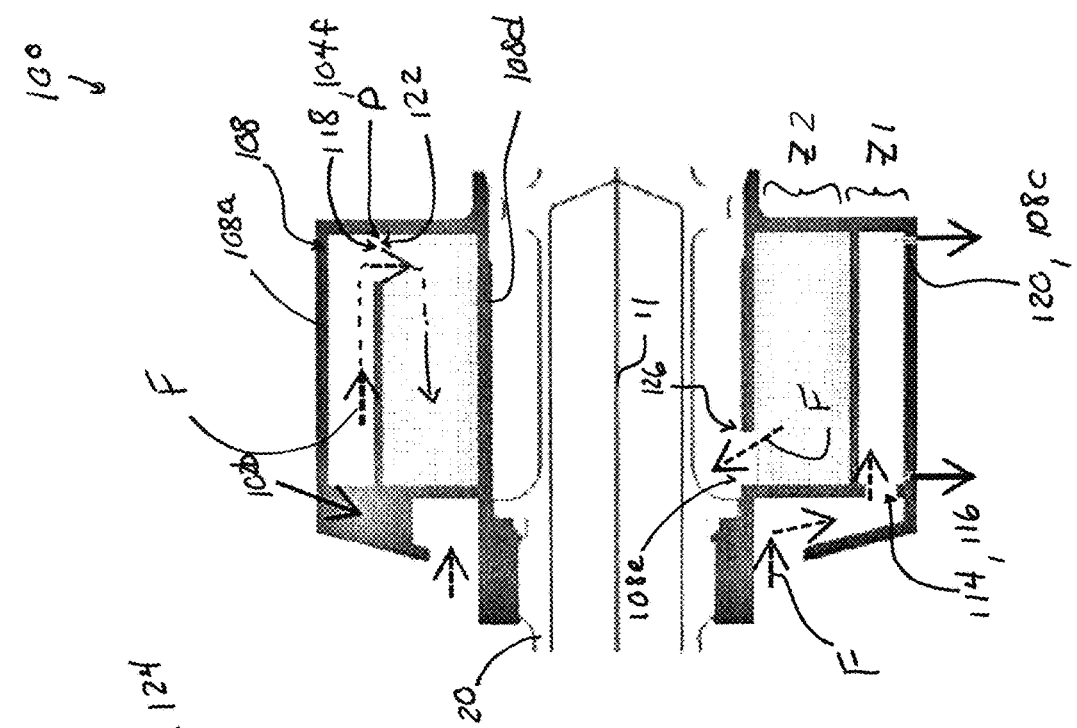
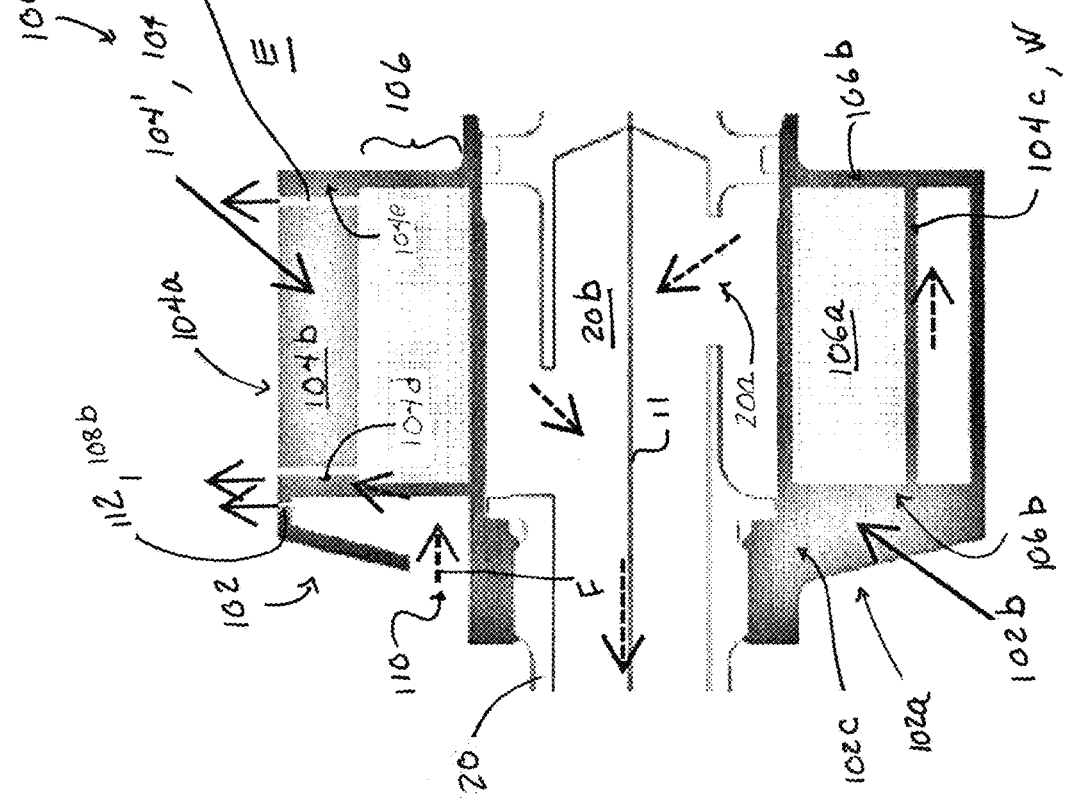

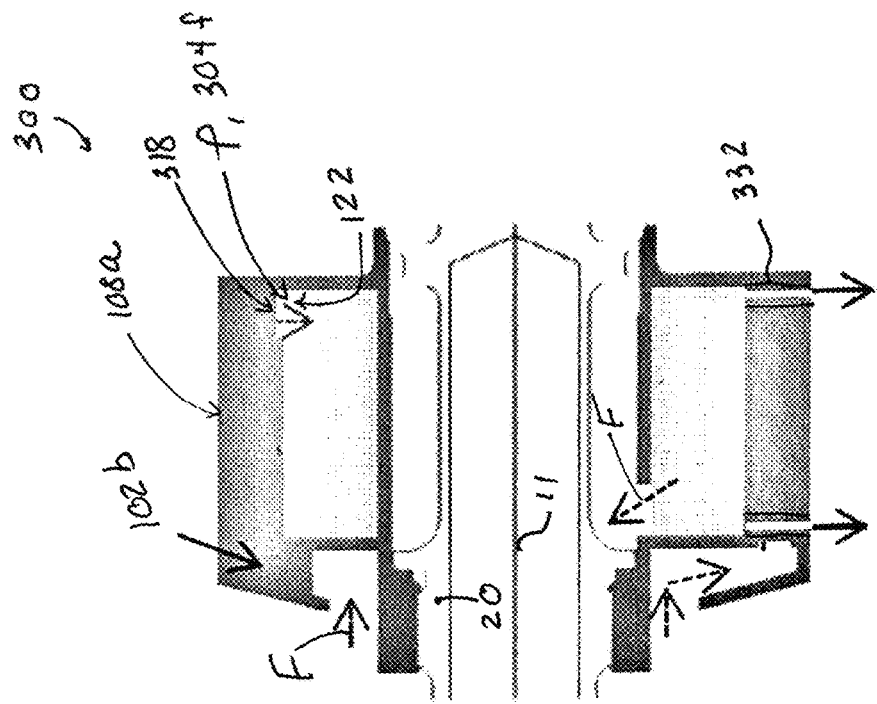
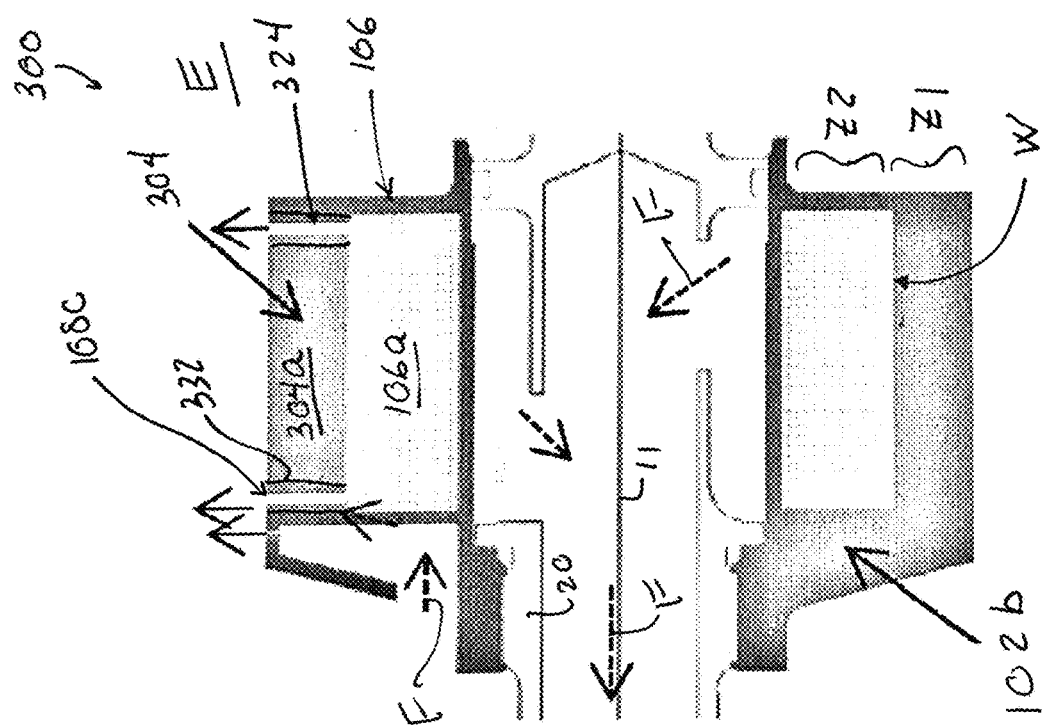

AIR-OIL SEPARATOR WITH FIRST SEPARATOR RADIALLY OUTWARD OF MATRIX SEPARATOR

TECHNICAL FIELD

The application relates generally to gas turbine engines and, more particularly, to air-oil separators used for separating air from oil of an air-oil mixture.

BACKGROUND OF THE ART

In a gas turbine engine, pressurized air from the compressor is used for sealing bearing cavities that contain bearings and/or a gearbox cavity that contains gears. The air that enters such a cavity is then mixed with lubricant. Before expelling the pressurized air back to the atmosphere, the lubricant contained within an air-oil mixture may be removed, either for being reused, or at least for avoiding evacuating the lubricant to the atmosphere. To carry such a function, air-oil separators are conventionally used. Two types of air-oil separators commonly used are bladed separators and matrix separators. In a bladed separator, a rotor having blades rotates and lubricant droplets are impacted by the blades and flow along the blades toward openings for evacuation. In a matrix separator, the lubricant droplets coalesce against the matrix and migrate radially within the matrix, via centrifugal force for evacuation.

Bladed separators are efficient in catering to an air-oil mixture characterized by a high lubricant concentration while minimizing a pressure drop therethrough. Matrix separators are efficient in catering to an air-oil mixture characterized by a low concentration of lubricant. However, matrix separators impart a greater pressure drop than their bladed counterpart when fed with an air-oil mixture of equivalent lubricant concentration. Consequently, improvements are possible.

SUMMARY

In one aspect, there is provided an air-oil separator for a gas turbine engine, the air-oil separator comprising: a first separator rotatable about a rotation axis and having an air-oil mixture inlet and an air-oil mixture outlet, the first separator configured to separate an air-oil mixture having a first oil concentration; a matrix separator having a porous media and configured to separate an air-oil mixture having a second oil concentration less than the first oil concentration, the matrix separator rotatable about the rotation axis, the matrix separator having an air-oil mixture inlet, the matrix separator disposed at least partially concentrically within the first separator; a wall disposed radially between the first separator and the matrix separator and extending axially relative to the rotation axis, a radial passage extending through the wall, the air-oil mixture outlet of the first separator fluidly connected to the air-oil mixture inlet of the matrix separator via the radial passage; and at least one passage extending radially outwardly from the matrix separator across the first separator, the at least one passage fluidly connecting the matrix separator to an environment outside the air-oil separator.

In another aspect, there is provided an air-oil separator securable to a shaft of a gas turbine engine for rotation about a rotation axis, the air-oil separator comprising: a first separator rotatable about the rotation axis and configured to separate an air-oil mixture having a first oil concentration; and a matrix separator rotatable about the rotation axis and configured to separate an air-oil mixture having a second oil concentration less than the first oil concentration, the matrix separator having a porous media, the matrix separator disposed at least partially concentrically within the first separator, the air-oil separator defining a flow path extending from an air-oil mixture inlet of the first separator to an air outlet of the air-oil separator, the flow path extending in a radial direction relative to the rotation axis when passing from the first separator to the matrix separator through at least one radial passage fluidly connecting the first separator to the matrix separator, the radial passage extending through a wall disposed radially between the first and matrix separators, at least one passage extending radially outwardly from the matrix separator across the first separator, the at least one passage fluidly connecting the matrix separator to an environment outside the air-oil separator.

In yet another aspect, there is provided a method of removing oil from an air-oil mixture circulating in an air-oil separator, comprising: receiving an air-oil mixture; extracting a portion of lubricant droplets of the air-oil mixture within a first zone of the air-oil separator; directing the air-oil mixture toward the rotation axis and toward a second zone of the air oil separator, the second zone finer than the first zone, the second zone disposed radially inwardly to the first zone and axially overlapping the first zone relative to the rotation axis; coalescing at least a portion of a remainder of the lubricant droplets contained within the directed air-oil mixture through the second zone; and directing the coalesced lubricant droplets in the radial direction out of the second zone by bypassing the first zone.

DESCRIPTION OF THE DRAWINGS

Reference is now made to the accompanying figures in which:

FIG. 2a is a schematic cross-sectional view of an air-oil separator in accordance with one embodiment;

FIG. 2b is a schematic cross-sectional view of the air-oil separator of FIG. 2a, but showing a different cross-section than FIG. 2a;

FIG. 3b is a schematic cross-sectional view of the air-oil separator of FIG. 3a, but showing a different cross-section than FIG. 3a;

FIG. 4a is a schematic cross-sectional view of an air-oil separator in accordance with another embodiment; and FIG. 4b is a schematic cross-sectional view of the air-oil separator of FIG. 4a, but showing a different cross-section than FIG. 4a.

DETAILED DESCRIPTION

Figure 1:
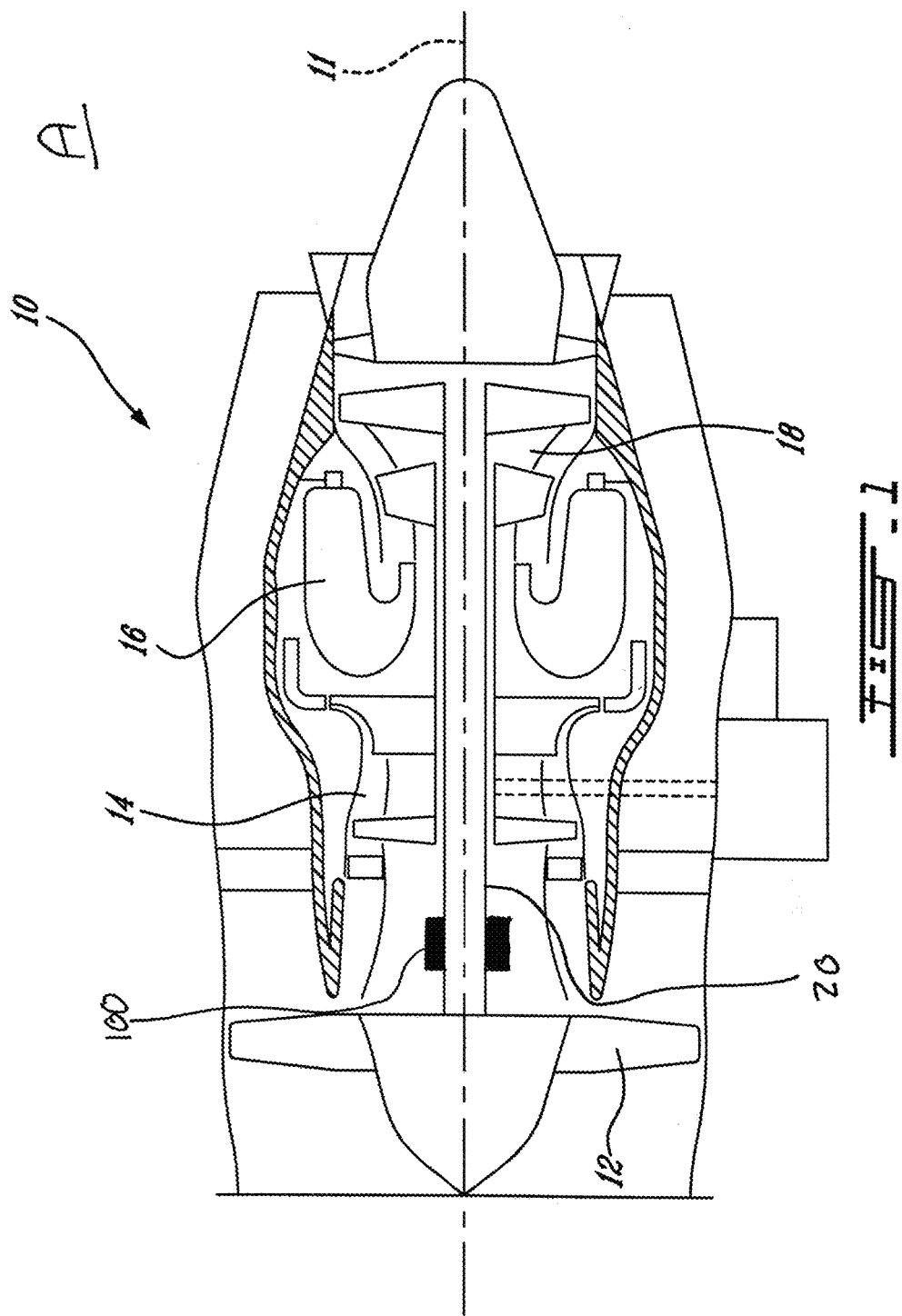
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The fan 12, compressor section 14, and turbine section 18 rotate on a shaft 20 about a rotational axis 11 of the gas turbine engine 10. As shown, an air-oil separator 100 is mounted on the shaft for integral rotation therewith. The air-oil separator 100 is used for separating an air-oil mixture that comes from either a bearing cavity or a gearbox cavity. More specifically, the bearing and/or gearbox cavity is sealed using pressurized air from the compressor section 14. The compressed air flows within the cavity thereby increasing its lubricant content. When the pressurized air exits the cavity, it is no longer only air, but an air-oil mixture. As there is no use for such a mixture, it has to be expelled. But, from an environmental perspective, it is not desirable to expel lubricant within an atmosphere A surrounding the gas turbine engine 10. Therefore, the air-oil mixture passes through the air-oil separator 100 in which the lubricant of the air-oil mixture is at least partially removed and scavenged. The scavenged lubricant may be reused.

Referring now to FIGS. 2a and 2b, an air-oil separator in accordance with one embodiment is generally shown at 100. The air-oil separator, which is referred to herein below as the separator 100, is configured for rotation about the rotation axis 11 of the gas turbine engine 10. It is however understood that any other means used for rotating the separator 100 may be used without departing from the scope of the present disclosure.

In the embodiment shown, the separator 100 has, in an upstream to downstream order relative to a flow of an air-oil mixture circulating therein, a first bladed separator 102, a second separator 104' being, as shown, a second bladed separator 104, and a matrix separator 106. All of which are contained within a casing 108. The casing 108 includes an outer circumferential wall 108a that surrounds the first and second bladed separators 102, 104 and the matrix separator 106. The casing 108 is securable to the shaft 20 of the gas turbine engine 10. The matrix separator 106 is downstream of both the first and second bladed separators 102, 104. Such a configuration might offer advantages that are discussed herein below. Each of the first bladed separator 102, the second bladed separator 104, and the matrix separator 106 are consecutively described herein below.

The first bladed separator 102 includes a rotor 102a having blades 102b circumferentially distributed around the rotation axis 11 and mounted on, and protruding from, a hub 102c. The rotor 102a is configured for rotating integrally with the shaft 20 of the gas turbine engine 10. The first bladed separator 102 has an air-oil mixture inlet 110 located adjacent leading edges and proximate roots of the blades 102b. In the embodiment shown, the air-oil mixture inlet 110 is annular and circumferentially extends around the rotation axis. When the air-oil mixture enters the first bladed separator 102, via its air-oil mixture inlet 110, it deviates from a substantially axial direction to a substantially radial direction, relative to the rotation axis 11, to flow radially away from the hub 102c and away from the rotation axis 11.

Rotation of the rotor 102a is such that its blades 102b impact lubricant droplets that are contained within the air-oil mixture. Once impacted, the droplets remain in contact with the blades 102b and move radially away from the rotation axis 11 because of the centrifugal force. A first oil outlet 112 is defined by the casing outer circumferential wall 108a for allowing the lubricant droplets that have been impacted by the blades 102b to exit the separator 102. In the embodiment shown, the first oil outlet 112 includes a plurality of apertures 108b defined through the casing outer circumferential wall 108a and that are circumferentially distributed around the rotation axis 11. Therefore, the impacted lubricant droplets migrate in the radial direction toward tips of the blades 102b. When the droplets reach the blade tips, they flow toward an environment E outside the separator 100 via the apertures 108b of the outer circumferential wall 108a.

At this stage, the air-oil mixture, though its lubricant content may have been decreased via its passage through the first bladed separator 102, might still contain lubricant. Therefore, further separation might still be required. The air-oil mixture exits the first bladed separator 102 via an air-oil mixture outlet 114 thereof. In the embodiment shown, the first bladed separator air-oil mixture outlet 114 is an annular passage circumferentially extending around the rotation axis 11 and axially disposed between the first and second bladed separators 102,104.

The air-oil mixture outlet 114 of the first bladed separator 102 corresponds to an air-oil mixture inlet 116 of the second bladed separator 104. The second bladed separator 104 includes a rotor 104a having a plurality of axial blades 104b circumferentially distributed around the rotation axis 11 and mounted on, and protruding from, a hub 104c. In the embodiment shown, the hub 104c rotates integrally with the casing 108 and with the shaft 20. The air-oil mixture inlet 116 of the second bladed separator 104 is located adjacent leading edges 104d of the blades 104b and an air-oil mixture outlet 118 of the second bladed separator 104 is located adjacent trailing edges 104e of the blades 104b.

Operation of the second bladed separator 104 is similar than that of the first bladed separator 102 in that lubricant droplets are impacted by the blades 104b and move radially outwardly away from the rotation axis 11 and away from the hub 104c toward tips of the second bladed separator blades 104b.

For allowing the lubricant droplets that have been impacted by the second bladed separator blades 104b, a second oil outlet 120 is defined by the casing outer circumferential wall 108. In the embodiment shown, the second oil outlet 120 includes a plurality of apertures 108c that are circumferentially distributed around the rotation axis 11 and defined through the casing circumferential outer wall 108a. In the embodiment shown, the plurality of apertures 108c are located adjacent both leading and trailing edges 104d, 104e of the blades 104b of the second bladed separator 104. When the droplets reach the blade tips, they flow toward the environment E outside the separator 100 via the apertures 108c defined through the outer circumferential wall 108a.

In the embodiment shown, the hub 104c of the second bladed separator 104 acts as a wall W that is disposed radially between the second bladed separator blades 104b and the matrix separator 106 relative to the rotation axis 11. The matrix separator 106 has an air-oil mixture inlet 122 fluidly connected to the air-oil mixture outlet 118 of the second bladed separator 104. In the embodiment shown, the second bladed separator hub 104c defines a plurality of circumferentially distributed apertures 104f defined through the hub 104c proximate trailing edges 104e of the blades 104b. The plurality of apertures 104f may be located between two consecutive ones of the blades 104b of the second bladed separator 104. Hence, the air-oil mixture outlet 118 of the second bladed separator 104 and the air-oil mixture inlet 122 of the matrix separator 106 both correspond to the apertures 104f defined through the second bladed separator hub 104c. The apertures 104f define radial passages P for the air-oil mixture to circulate from the second bladed separator 104 to the matrix separator 106. At least one radial passage P is provided. A number of the radial passages P may be varied.

The matrix separator 106 axially overlaps the second bladed separator 104 and is disposed concentrically to the second bladed separator 104, relative to the rotation axis 11. In the embodiment shown, the second bladed separator 104 is disposed radially outwardly to the matrix separator 106 relative to the rotation axis 11.

The matrix separator 106 includes a porous media 106a that may be provided in a form of a disk circumferentially extending around the rotation axis 11. Such media 106 may be, for instance, a sponge or a mesh material, defining a plurality of intricate micro passages that are in fluid communication with one another. In such a porous media 106a, a flow path circulating therethrough would be tortuous as it moves from one micro passage to another. As illustrated, the porous media 106a rotates integrally with both of the casing 108 and the shaft 20 of the gas turbine engine 10. In the embodiment shown, the porous media 106a is located radially inwardly to the hub 104c of the second bladed separator 104. In other words, the porous media 104a extends radially between an inner circumferential wall 108d of the casing 108 and the second bladed rotor hub 104c.

In the embodiment shown, the matrix separator 106 is finer than the second bladed separator 104. Stated otherwise, spaces defined between the blades 104b of the second bladed separator 104 are greater than dimensions of the micro passages of the porous media 106a of the matrix separator 106. Hence, the matrix separator 106 may be able to extract smaller droplets of lubricant contained within the air-oil mixture.

By flowing through the porous media 106a, the lubricant droplets that have not been impacted by the blades 102b, 104b of the first and second bladed separators 102, 104 coalesce against the material of the porous media 106a. Via the centrifugal force, the coalesced lubricant droplets merge radially away from the rotation axis 11, toward the hub 104c of the second bladed separator rotor 104a. Therefore, the hub 104c, or wall W, may preclude the coalesced droplets of lubricant from re-circulating within the spaces defined between the blades 104b of the second bladed separator 104.

Nevertheless, the coalesced droplets have to be expelled to the environment E outside the separator 100. For that purpose, at least one fluid passage 124 extends radially outwardly from the matrix separator 106 and across the second bladed separator 104 for expelling oil extracted by the matrix separator 106 toward the environment E outside the air-oil separator 100. In the embodiment shown, the at least one fluid passage 124 extends within a thickness of the blades 104b of the second bladed separator 104. Stated otherwise, the at least one fluid passage, which, as shown, includes a plurality of fluid passages, extends from roots of the blades 104b to tips of the blades 104b between pressure and suction sides of the blades 104b. In the embodiment shown, each of the blades 104b has two fluid passages 124 located adjacent a respective one of its leading and trailing edges 104d, 104e. In the embodiment shown, the second oil outlet 120 is fluidly connected to both of the second separator 104', which is the second bladed separator 104, and the at least one fluid passage 124.

The centrifugal force pushes the coalesced lubricant droplets along a span of the second bladed separator blades 104b through the fluid passages 124. The fluid passages 124 are in fluid flow communication with the micro passages of the porous media. Hence, the micro passages are fluidly connected to the environment E outside the separator 100 via the fluid passages 124 of the second bladed separator blades 104b. Once the lubricant reaches an extremity of the fluid passages 124, which is at the blade tips, the lubricant is expelled to the environment E outside the separator 100 via the apertures 108c defined through the casing outer circumferential wall 108.

A lubricant content of the air-oil mixture may decrease along its passage through the porous media 106a of the matrix separator 106. Air that may have been substantially cleaned from lubricant continues to flow radially inwardly toward the rotation axis 11. In the embodiment shown, an air outlet 126 of the separator 100 is defined by at least one aperture 108e defined through the casing inner circumferential wall 108d that may register with at least one aperture 20a defined through the gas turbine engine shaft 20, which is hollow and defines an air conduit 20b. The air conduit 20b of the hollow shaft 20 is fluidly connected to the atmosphere A outside the gas turbine engine 10. In other words, micro passages of the porous media 106a are fluidly connected to the atmosphere A via the at least one aperture 108e of the inner circumferential wall 108d, via the at least one aperture 20a of the engine shaft 20, and via the shaft air conduit 20b. In the embodiment shown, the air of the air-oil mixture has a pressure greater than that of the atmosphere A. This explains why the air flows radially inwardly toward the rotation axis 11 in spite of the centrifugal force imparted by rotation of the separator 100.

In the depicted embodiment, the separator air outlet 126 and the air-oil mixture inlet 122 of the matrix separator 106 are disposed proximate a respective one of axial ends 106b of the porous media 106a. Therefore, by having the separator air outlet 126 and the air-oil mixture inlet 122 axially offset from one another, a distance travelled by the air-oil mixture within the porous media 106a is increased compared to a configuration without the axial offset of the air outlet 126 and air-oil mixture inlet 122. By maximizing the distance, an efficiency of the matrix separator 106 might be increased because the air-oil mixture contacts a greater surface of the porous media 106a so that a quantity of lubricant that may be withdraw from the mixture might be increased compared to a configuration in which the distance is shorter.

Still referring to FIGS. 2a and 2b, the separator 100 defines a flow path F that extends from the air-oil mixture inlet 116 of the first bladed separator 102 to the air outlet 126 of the separator 100. Along the flow path F, a lubricant concentration of the air-oil mixture might decrease. It is understood that what passes through the air outlet 126 of the separator 100 might still contain a residual amount of lubricant and, hence, may be referred to as an air-oil mixture.

A portion of the flow path F that is located within the second bladed separator 104 and the matrix separator 106 defines a "C"-shape. Within this portion, the flow path F extends in the radial direction, relative to the rotation axis 11, when passing from the second bladed separator 104 to the porous media 106a via the at least one radial passage P. More specifically, the flow path F defines the "C"-shape when passing from between spaces defined between each two consecutive ones of the blades 104b of the second blade separator 104 to the porous media 106a of the matrix separator 106, through the at least one aperture 104f defined through the hub 104c.

Figure 3B:
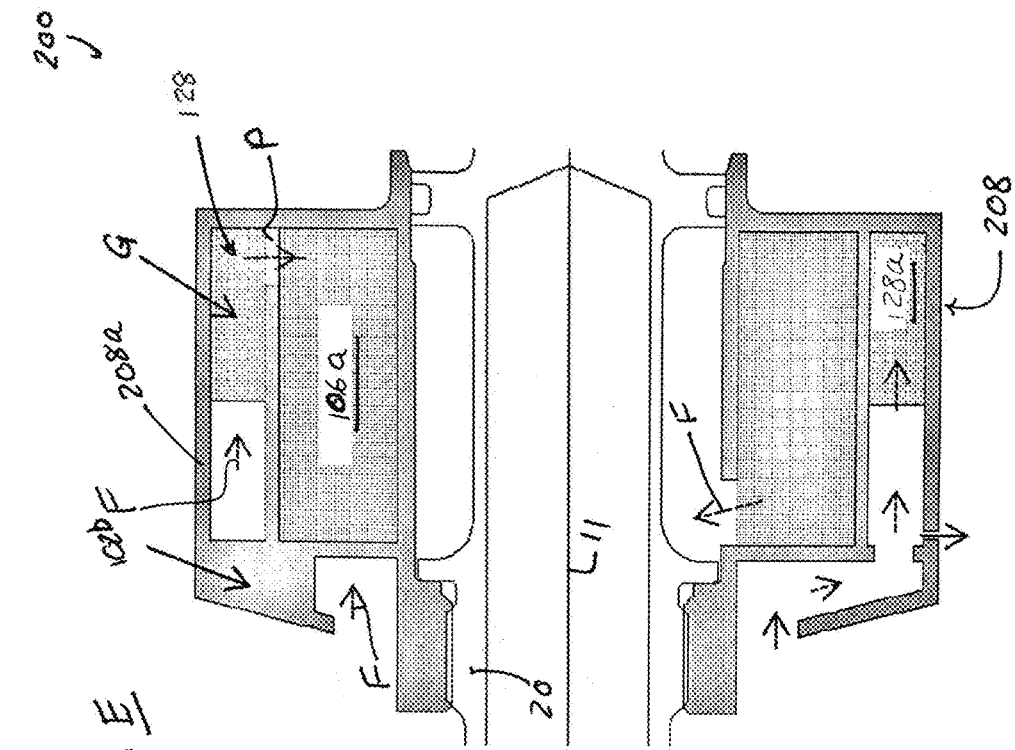
Figure 3A:
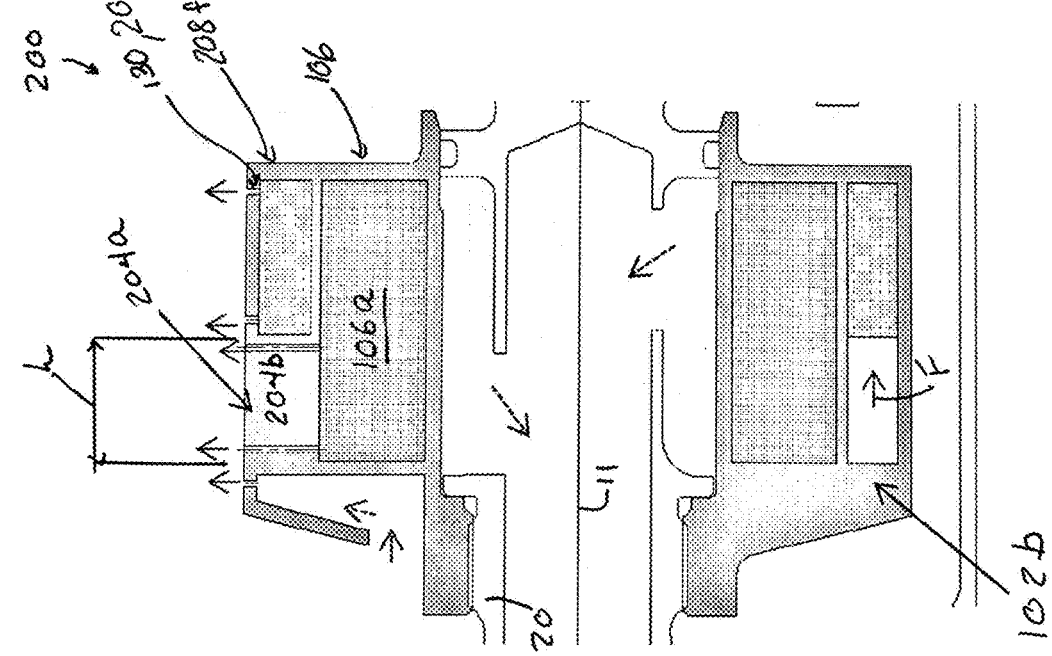
FIG. 3a is a schematic cross-sectional view of an air-oil separator in accordance with another embodiment.

Now referring to FIGS. 3a and 3b, another embodiment of an air-oil separator is generally shown at 200. For the sake of conciseness, only elements that differ from the air-oil separator 100 of FIGS. 2a and 2b are described herein below.

An axial length L of the blades 204b of the second bladed rotor 204a relative to the rotation axis 11 is selected in function of the air-oil mixture that has to be separated. In other words, and as aforementioned, for separating lubricant from air, the second bladed separator blades 204b needs to impact the lubricant droplets. When a size of the droplets falls below a given threshold, the droplets and the air surrounding them move in a similar fashion such that the blades 204b are no longer able to impact the smaller droplets. As a result, the second bladed rotor 204a is not able to further separate the air-oil mixture. Therefore, the axial length L of the blades 204b relative to the rotational axis 11 may be tuned so that it matches a point where all the droplets that have a size greater than the threshold have been impacted and separated from the mixture.

In the embodiment shown, this axial length L, relative to the rotation axis 11, is less than that of the porous media 106a of the matrix separator 106. Therefore, an axial gap G is created and is located axially between the second bladed separator blades 204b and a rear end 208f of the casing 208. In the embodiment shown, a second matrix separator 128, which includes a porous media 128a, is provided in a form of a disk circumferentially extending around the rotation axis 11. The second matrix separator 128 is disposed within the gap G, to fill the gap G.

A density of the porous media 128a of the second matrix separator 128 is less than that of the porous media 106a of the matrix separator 106. In other words, the second matrix separator porous media 128a is coarser than the matrix separator porous media 106a. Stated otherwise, dimension of micro passages of the porous media 128a of the second matrix separator 128 is greater than that of the porous media 106a of the matrix separator 106. Therefore, the second matrix separator might be able to remove lubricant droplets that are smaller than what the bladed separators are able to remove. By removing these droplets before circulating the air-oil mixture within the matrix separator 106, a pressure drop through the matrix separator 106 may be less than what it would have been without the second matrix separator 128.

The second matrix separator 128a has an oil outlet 130 for expelling the extracted lubricant to the environment E outside the separator 200. The oil outlet 130 corresponds to a least one aperture 208g defined through the outer circumferential wall 208a of the casing 208. As shown, the at least one aperture 208g includes a plurality of apertures defined through the wall 208a and circumferentially distributed around the rotation axis 11. In the illustrate embodiment, the apertures 208g are located at both axial ends of the second matrix separator 106.

Referring now to FIGS. 4a and 4b, another embodiment of an air-oil separator is generally shown at 300. For the sake of conciseness, only elements that differ from the air-oil separator 100 of FIGS. 2a and 2b are described herein below. In this embodiment, the second separator 104' is an outward matrix separator 304 having a porous media 304a of a density less than that of the porous media 106a of the matrix separator 106. As such, the outward matrix separator 304 is configured to cater to lubricant droplets that are bigger in size than a size of the lubricant droplets the matrix separator 106 is configured to cater for. In the present specification and claims, "configured to cater to" means that the separator is tailored, or tuned, to separate oil from an air-oil mixture characterized by a specific range of oil concentrations.

A wall W is disposed radially between the outward matrix separator 304, and the matrix separator 106. At least one radial passage P extends through the wall W for fluidly connecting the air-oil mixture outlet 318 of the outward matrix separator 304 and the air-oil mixture inlet 122 of the matrix separator 106, which both correspond to at least one aperture 304f defined through the wall W. The wall W may preclude the coalesced lubricant from re-circulating through the porous media 304a of the outward matrix separator 304, and thus from increasing a lubricant concentration of the air-oil mixture circulating through the outward matrix separator 304.

However, when the lubricant coalesces in the matrix separator 106, it migrates radially outwardly away from the rotation axis 11, and should be expelled to the environment E outside the separator 300. For being expelled, the lubricant extends through at least one passage 324 defined through the outward matrix separator 304. In the embodiment shown, the at least one passage 324 is defined by a plurality of circumferentially distributed hollow struts 332 that extend radially through the outward matrix separator 304. Therefore, the environment E outside the separator 300 is fluidly connected to the micro passage of the matrix separator 106 via the fluid passages 324 of the plurality of hollow struts 332, and via the apertures 108c defined through the casing outer circumferential wall 108a. The struts 332 may have any suitable aerodynamic profile configured for minimizing a resistance of the air-oil mixture circulating through the outward matrix separator 304.

Number and dimensions of the apertures 108b, 108c, defined through the casing circumferential inner and outer walls 108d, 108a and through the hub/wall 104c, W may be optimized in function of a lubricant content of the air-oil mixture. Similarly, number and dimensions of the fluid passages 124 extending through the second bladed separator blades 104b may be optimized in function of a lubricant content of the air-oil mixture. The same goes for the density—and dimensions of the micro passage—of the porous media 106a, 128a, 304a, which may optimized in function of a lubricant content of the air-oil mixture.

Although the matrix separator porous media 106a has been illustrated has containing only one layer, it is understood that it may include a plurality of layers, either axially or radially distributed, of varying densities. Other configurations are contemplated without departing from the scope of the present disclosure.

Referring to FIGS. 2a and 2b, for removing lubricant from the air-oil mixture circulating in the air-oil separator 100, the air-oil mixture is received within the separator 100 and a portion of the lubricant droplets is extracted therefrom, within a first zone Z1 of the separator 100. The air-oil mixture is directed toward the rotation axis 11 and toward a second zone Z2 of the air oil separator 100. The second zone Z2 is disposed radially inwardly to the first zone Z1 and axially overlaps the first zone Z1 relative to the rotation axis 11. The second zone Z2 is finer than the first zone Z1. At least a portion of a remainder of the lubricant droplets contained within the directed air-oil mixture is coalesced through the second zone Z2. The coalesced lubricant droplets are directed in the radial direction out of the second zone Z2 by bypassing the first zone Z1. In the embodiment shown, the portion of the lubricant droplets is extracted by impacting the portion of the lubricant droplets with blades 104b of a rotor 104a rotating about the rotation axis 11.

Referring more particularly to FIGS. 4a and 4b, the portion of the lubricant droplets is extracted by coalescing the portion within a porous media 304a and at least a portion of the lubricant droplets are impacted with blades 102b of the rotor 102a rotating about the rotation axis 11 before being coalesced in the first zone Z1.

In a particular embodiment, having a combination of the bladed separator and the matrix separator allows for a better separation efficiency without increasing a pressure drop between inlet and outlet of the separator. Moreover, axially overlapping the matrix and blades separator allows a reduction of an axial length of the device. This might be of great importance on smaller gas turbine engines. Moreover, removing bigger droplets via a passage of the air-oil mixture through the bladed separator might preclude the matrix separator from clogging.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A gas turbine engine comprising an air-oil separator, the air-oil separator having:
    a first separator rotatable about a rotation axis and having an air-oil mixture inlet and an air-oil mixture outlet, the first separator configured to separate an air-oil mixture having a first oil concentration;
    a matrix separator having a porous media and configured to separate an air-oil mixture having a second oil concentration less than the first oil concentration, the matrix separator rotatable about the rotation axis, the matrix separator having an air-oil mixture inlet, the matrix separator disposed at least partially concentrically within the first separator and at least partially axially overlapping the first separator;
    a wall disposed radially between the first separator and the matrix separator and extending axially relative to the rotation axis, a radial passage extending through the wall, the air-oil mixture outlet of the first separator fluidly connected to the air-oil mixture inlet of the matrix separator via the radial passage; and
    at least one passage extending radially outwardly from the matrix separator across the first separator, the at least one passage fluidly connecting the matrix separator to an environment outside the air-oil separator.

2. The gas turbine engine of claim 1, wherein the first separator and the matrix separator are disposed within a casing, the casing being secured to a shaft of the gas turbine engine, the casing rotating integrally with the first separator and the matrix separator.

3. The gas turbine engine of claim 2, wherein the first separator has an oil outlet corresponding to apertures defined through an outer circumferential wall of the casing, the oil outlet fluidly connected to both of the at least one passage and the first separator.

4. The gas turbine engine of claim 1, wherein the at least one passage includes a plurality of passages circumferentially distributed around the rotation axis.

5. The gas turbine engine of claim 1, wherein the first separator is a bladed separator having blades protruding from a hub, the wall corresponding to the hub, the at least one passage extending within a thickness of one of the blades, between a pressure side and a suction side of the one of the blades.

6. The gas turbine engine of claim 5, wherein an axial length of the blades of the rotor relative to the rotation axis is less than that of the porous media relative to the rotation axis.

7. The gas turbine engine of claim 6, wherein a gap extends from the blades to a rear end of the matrix separator, another matrix separator being located within the gap, the other matrix separator configured to separate an air-oil mixture having a third oil concentration being more than the second oil concentration and less than the first oil concentration.

8. The gas turbine engine of claim 1, wherein the first separator is an outward matrix separator, the air-oil separator further having a bladed separator located upstream of the outward matrix separator, the bladed separator including a rotor having radially extending blades, the rotor configured for rotation about the rotation axis, the bladed separator having an air-oil mixture outlet fluidly connected to the air-oil mixture inlet of the first separator.

9. The gas turbine engine of claim 1, wherein the porous media is a sponge.

10. A gas turbine engine having a shaft, the gas turbine engine comprising an air-oil separator secured to the shaft for rotation about a rotation axis, the air-oil separator having: a first separator rotatable about the rotation axis and configured to separate an air-oil mixture having a first oil concentration; and a matrix separator rotatable about the rotation axis and configured to separate an air-oil mixture having a second oil concentration less than the first oil concentration, the matrix separator having a porous media, the matrix separator disposed at least partially concentrically within the first separator, one of the first separator and the matrix separator disposed around the other of the first separator and the matrix separator, the air-oil separator defining a flow path extending from an air-oil mixture inlet of the first separator to an air outlet of the air-oil separator, the flow path extending in a radial direction relative to the rotation axis when passing from the first separator to the matrix separator through at least one radial passage fluidly connecting the first separator to the matrix separator, the radial passage extending through a wall disposed radially between the first and matrix separators, at least one passage extending radially outwardly from the matrix separator across the first separator, the at least one passage fluidly connecting the matrix separator to an environment outside the air-oil separator.

11. The gas turbine engine of claim 10, wherein the at least one passage includes a plurality of passages circumferentially distributed around the rotation axis.

12. The gas turbine engine of claim 10, wherein the first separator is a bladed separator having blades protruding from a hub, the wall corresponding to the hub, the at least one passage extending within a thickness of one of the blades, between a pressure side and a suction side of the one of the blades.

13. The gas turbine engine of claim 12, wherein an axial length of the blades of the rotor relative to the rotation axis is less than that of the porous media relative to the rotation axis.

14. The gas turbine engine of claim 13, wherein a gap extends from the blades to a rear end of the matrix separator, another matrix separator being located within the gap, the other matrix separator configured to separate an air-oil mixture having a third oil concentration being more than the second oil concentration and less than the first oil concentration.

15. The gas turbine engine of claim 10, wherein the first separator is an outward matrix separator, the air-oil separator further having a bladed separator located upstream of the outward matrix separator, the bladed separator including a rotor having radially extending blades, the rotor configured for rotation about the rotation axis, the bladed separator having an air-oil mixture outlet fluidly connected to an air-oil mixture inlet of the first separator.

16. The gas turbine engine of claim 10, wherein the porous media is a sponge.

17. The gas turbine engine of claim 10, wherein the first separator has an oil outlet corresponding to apertures defined through an outer circumferential wall of a casing, the first and matrix separators located within the casing, the casing being secured to the shaft of the gas turbine engine, the casing rotating integrally with the first and matrix separators, the oil outlet fluidly connected to both of the at least one passage and the first separator.

\* \* \* \* \*